(12) United States Patent
Cheng et al.

(10) Patent No.: US 9,099,051 B2
(45) Date of Patent: Aug. 4, 2015

(54) GPU DISPLAY ABSTRACTION AND EMULATION IN A VIRTUALIZATION SYSTEM

(75) Inventors: Gongxian Jeffrey Cheng, Toronto (CA); Syed Athar Hussain, Scarborough (CA)

(73) Assignee: ATI Technologies ULC, Markham, Ontario (CA)

( * ) Notice: Subject to any disclaimer, the term of this patent is extended or adjusted under 35 U.S.C. 154(b) by 102 days.

(21) Appl. No.: 13/410,553

(22) Filed: Mar. 2, 2012

(65) Prior Publication Data

US 2013/0229421 A1    Sep. 5, 2013

(51) Int. Cl.
*G06T 1/00*  (2006.01)
*G09G 5/36*  (2006.01)
*G06F 9/455*  (2006.01)
*G06T 1/20*  (2006.01)
*G06F 9/44*  (2006.01)

(52) U.S. Cl.
CPC .............. *G09G 5/363* (2013.01); *G06F 9/4445* (2013.01); *G06F 9/45558* (2013.01); *G06T 1/20* (2013.01); *G06F 2009/45579* (2013.01); *G09G 2340/0407* (2013.01); *G09G 2360/02* (2013.01); *G09G 2360/04* (2013.01); *G09G 2360/08* (2013.01); *G09G 2360/125* (2013.01)

(58) Field of Classification Search
None
See application file for complete search history.

(56) References Cited

U.S. PATENT DOCUMENTS

| | | | | |
|---|---|---|---|---|
| 8,453,148 | B1 * | 5/2013 | Hobbs | 718/102 |
| 2007/0159412 | A1 * | 7/2007 | Dai et al. | 345/1.1 |
| 2010/0214301 | A1 * | 8/2010 | Li et al. | 345/522 |
| 2011/0102443 | A1 * | 5/2011 | Dror et al. | 345/522 |
| 2012/0167082 | A1 * | 6/2012 | Kumar et al. | 718/1 |
| 2012/0266165 | A1 * | 10/2012 | Cen et al. | 718/1 |

* cited by examiner

*Primary Examiner* — Tize Ma
*Assistant Examiner* — Yu Chen
(74) *Attorney, Agent, or Firm* — Volpe and Koenig, P.C

(57) ABSTRACT

A method, computer program product, and system that includes a virtual function module with an emulated display timing device, a first independent resource, and a second independent resource, where the first and second independent resources signal a physical function module that a new surface has been rendered, and where the physical function module signals the virtual function module via the emulated timing device and the first and second independent resources when the rendered new surface has been displayed, copied, used, or otherwise consumed.

32 Claims, 7 Drawing Sheets

GPU frame buffer memory partitions

GPU DISPLAY ABSTRACTION AND EMULATION IN A VIRTUALIZATION SYSTEM

BACKGROUND OF THE INVENTION

1. Field of the Invention

The present invention is generally directed to a graphics processing unit (GPU). More particularly, the present invention is directed to the use of a GPU with a virtual machine.

2. Background Art

Virtual machine technology allows users to run multiple operating systems simultaneously. Each operating system runs in a virtual machine which runs on the underlying physical hardware. Typically, the multiple virtual machines share an underlying physical display.

In most cases, computer users who run multiple virtual machines are interested in displaying each virtual machine simultaneously. In these cases, the computer users desire to run each virtual machine at an independent resolution and frame rate.

In order to display multiple virtual machines simultaneously at independent resolution and frame rates, a mechanism is needed to coordinate virtual machine access to the underlying physical display. Allowing multiple virtual machines to simultaneously access the underlying physical display would result in a corrupted display.

A current approach to providing coordinated access to the underlying physical display is implemented entirely by software using a brute force approach known as 'software abstraction.' Such coordination is provided by a virtual machine manager, also known as a hypervisor. A hypervisor vendor must present the virtual machine with a virtual GPU with its own display driver. The virtual machine display driver is instrumented, (e.g. an instrumented display driver) with hooks to communicate to the hypervisor to facilitate desktop composition and remote display of a virtual machine.

An instrumented driver is simpler than a full function driver because it merely funnels commands to the real driver. An instrumented driver, however, does not provide the complete functionality of the underlying GPU to the virtual machine. In addition, the instrumented driver incurs CPU overhead when it funnels commands to the real driver. In other words, an instrumented driver undermines the stated goal of virtualization technology: provide a complete illusion to the virtual machine software that it is running on the real physical hardware.

SUMMARY OF EMBODIMENTS OF THE INVENTION

Given the forgoing, what is needed is a method, computer program product, and system for performing coordinated access to physical display hardware from multiple virtual machines that does not require changes to the virtual machine software.

Embodiments of the present invention, under certain circumstances, include a method for coordinating virtual machine access to underlying physical display hardware based on an emulated surface register, an emulated flip status register, emulated display timings, and surface property registers. The method allows multiple virtual machines access to a local display or displaying a virtual machine on a remote display. Based on using the emulated surface register, the emulated flip status register, emulated display timings, and surface property registers, the virtual machine software can display a surface to the physical display as though it was executing on the underlying physical hardware.

Further features and advantages of the present invention, as well as the structure and operation of various embodiments of the present invention, are described in detail below with reference to the accompanying drawings. It is noted that the invention is not limited to the specific embodiments described herein. Such embodiments are presented herein for illustrative purposes only. Additional embodiments will be apparent to a person of ordinary skill in the relevant art based on the teachings contained herein.

BRIEF DESCRIPTION OF THE DRAWINGS

The accompanying drawings, which are incorporated herein and form a part of the specification, illustrate embodiments of the present invention and, together with the description, further serve to explain the principles of the invention and to enable a person of ordinary skill in the relevant art to make and use the invention.

DETAILED DESCRIPTION

An embodiment of the present invention provides a GPU virtual function module including an emulated surface register, an emulated flip status register, emulated display timing, surface property registers, and software thereof. In the detailed description that follows, references to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The term "embodiments of the invention" does not require that all embodiments of the invention include the discussed feature, advantage or mode of operation. Alternate embodiments may be devised without departing from the scope of the invention, and well-known elements of the invention may not be described in detail or may be omitted so as not to obscure the relevant details of the invention. In addition, the terminology used herein is for the purpose of describing particular embodiments only and is not intended to be limiting of the invention. For example, as used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Figure 1:
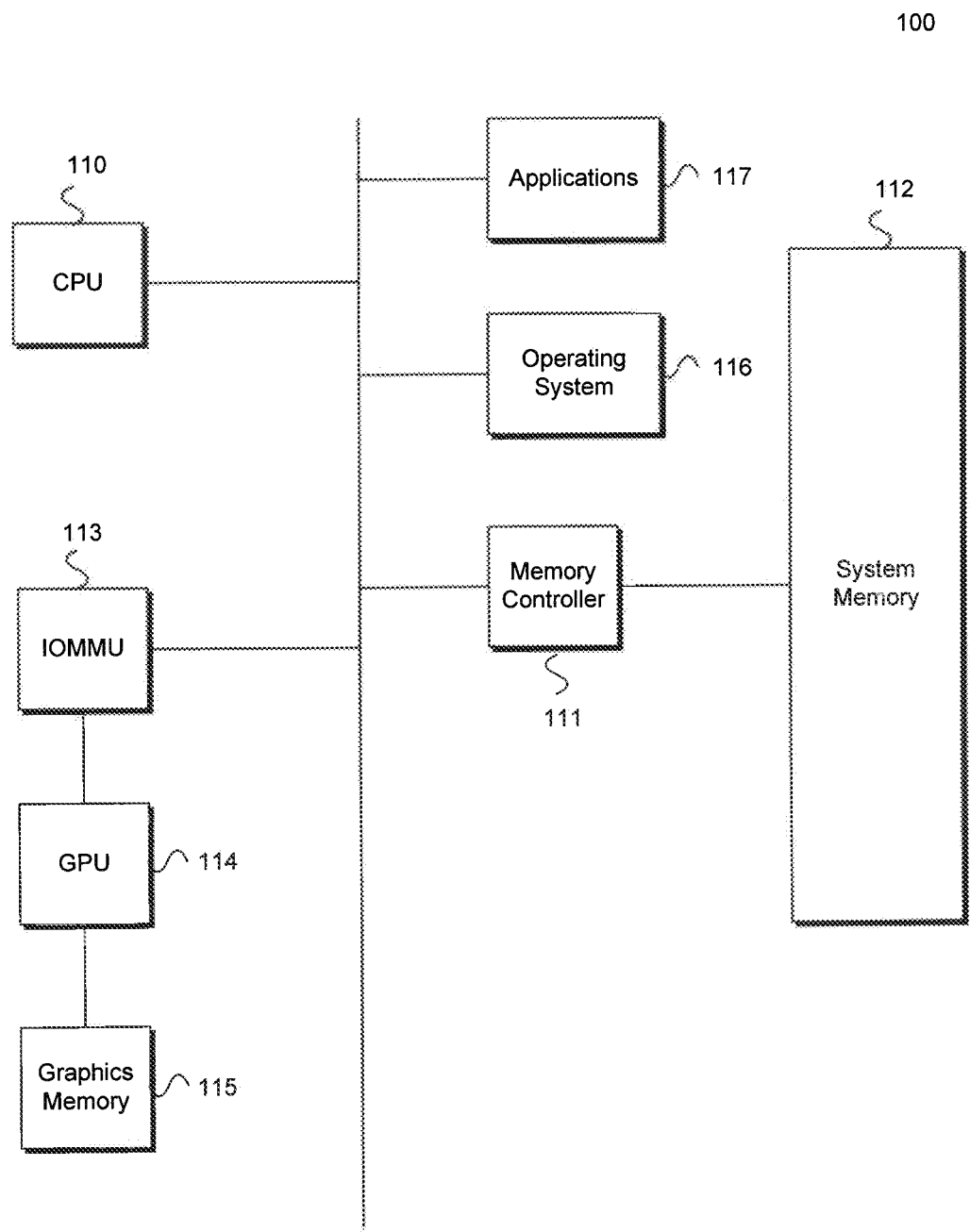
FIG. 1 is an illustration of a typical computer system capable of running multiple virtual machines, according to an embodiment of the invention.

FIG. 1 is a block diagram illustration of a computer system 100, according to an embodiment of the present invention. Computer system 100 includes a central processing unit (CPU) 110, a memory controller 111, a system memory 112, an input/output memory management unit (IOMMU) 113, a GPU 114, a graphic memory 115, an operating system 116, and applications 117. CPU 110 reads and writes instructions to and from system memory 112. Operating system 116 manages the computer hardware resources and provides common services to applications 117. Memory controller 111 manages the flow of data going to and from system memory 112.

GPU 114 processes and manipulates computer graphics. Graphics memory 115 stores the computer graphics to be output to a monitor. IOMMU 113 manages the flow of data between GPU 114 and system memory 112. More specifically, IOMMU 113 permits a virtual machine to directly access GPU 115 without the overhead of running through a hypervisor and without device emulation.

Figure 2:
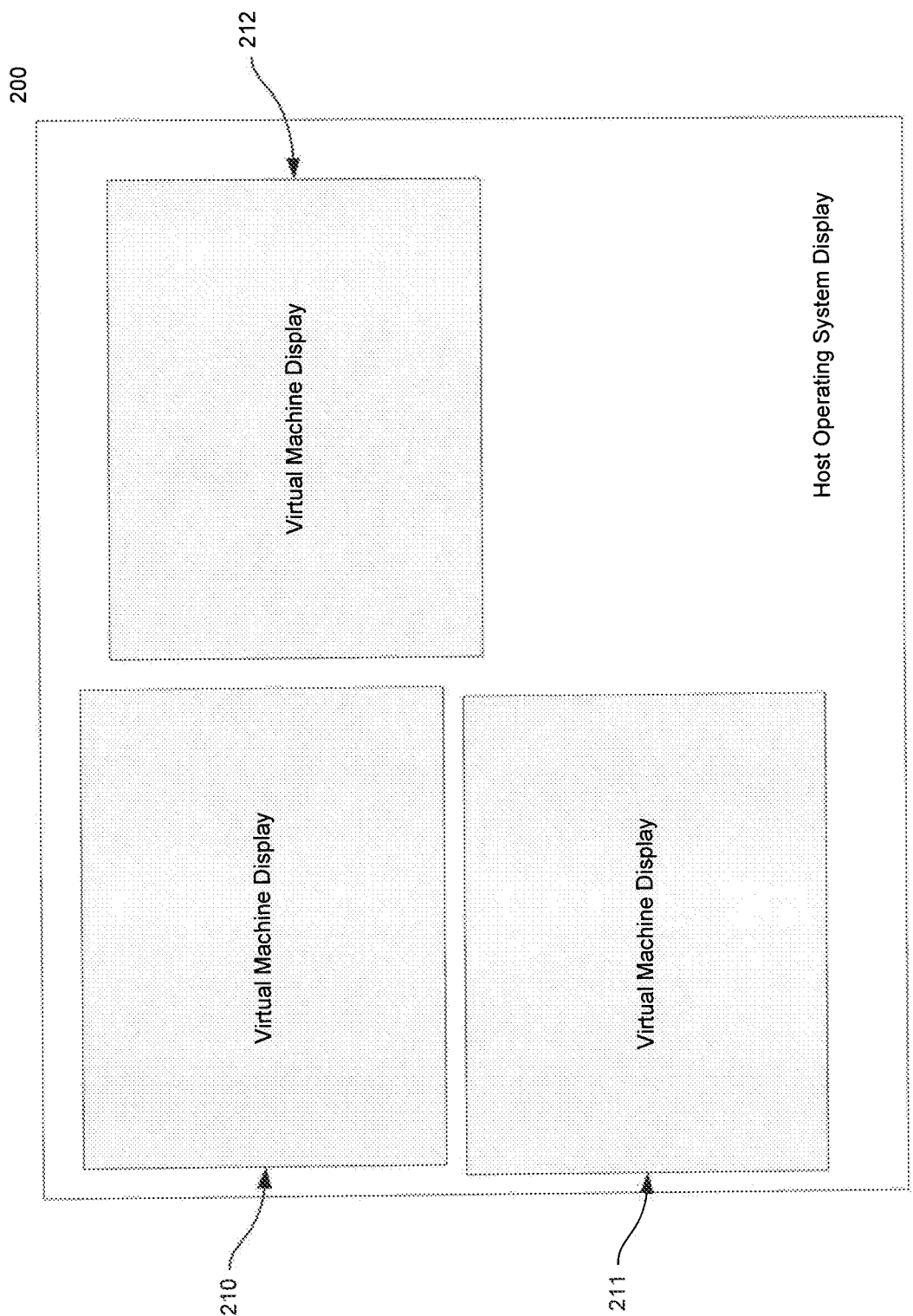
FIG. 2 is a screen shot of a computer system capable of displaying multiple virtual machines simultaneously to a monitor, according to an embodiment of the invention.

FIG. 2 is an illustration of screen display 200 of a computer system including multiple virtual machines, according to an embodiment of the present invention. Each virtual machine is capable of running a different operating system. For example, virtual machine 210 could run Microsoft Windows Server 2003, virtual machine 211 could run Apple Mac OS X 10.5, and virtual machine 212 could run Ubuntu Linux. The virtual machines share access to the underlying physical hardware.

Each virtual machine has an independent display timing, resolution, and pixel depth. For example, virtual machine 210 could have a display timing of 85 hertz, a resolution of 1600× 1200, and a pixel depth of 32-bit. Virtual machine 211 could have a display timing of 60 hertz, a resolution of 1024×768, and a pixel depth of 32-bit. Virtual machine 212 could have a display timing of 60 hertz, a resolution of 1280×1024, and a pixel depth of 16-bit.

In the illustrious embodiment of FIG. 2, screen display 200 is an illustration of multiple virtual machines sharing the same monitor. In this illustration, each virtual machine runs in a separate window. A desktop window composition program combines the multiple virtual machine windows into a single image for display on the same physical display. Although not illustrated here, display of a virtual machine across a network onto a remote monitor is contemplated by an embodiment of the present invention.

Figure 3:
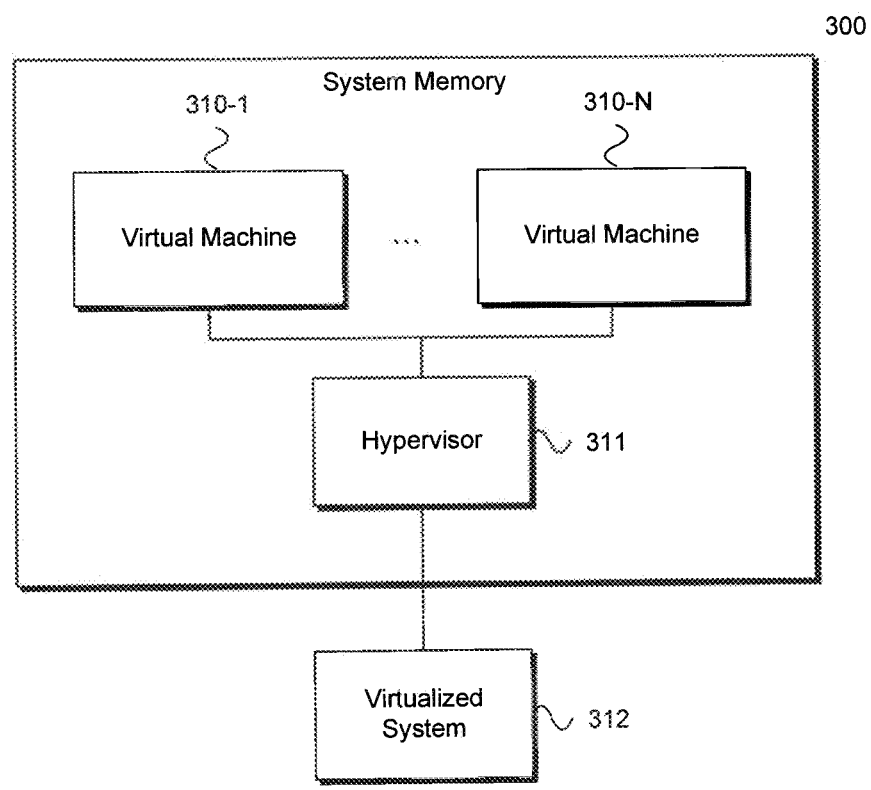
FIG. 3 is an illustration of the system memory of a computer system that runs multiple virtual machines, according to an embodiment of the invention.

FIG. 3 is an illustration of a system memory 300, according to an embodiment of the present invention. In FIG. 3, system memory 300 includes multiple virtual machines 310, shown as virtual machine 310-1 through 310-N (where N is any integer greater than or equal to 2), a hypervisor 311, and a virtualized system 312. Virtual machine 310 is a software implementation of a computer system that executes programs such as a physical computer system. Virtual machine 310 also supports the execution of an operating system and associated applications.

Hypervisor 311 allows multiple virtual machines 310 to share computer system 100. Each virtual machine includes a CPU, system memory, a GPU and other resources all to itself. Hypervisor 311, however, actually controls the CPU and resources, and allocates the necessary resources to each virtual machine in order that the virtual machines cannot disrupt each other.

Hypervisor 311 ensures one virtual machine does not disrupt the execution of another virtual machine by preventing virtual machines from simultaneously accessing the same physical hardware. Hypervisor 311 coordinates access to the physical hardware by intercepting requests from a virtual machine to use the physical hardware. Each request is translated and mapped onto the physical hardware by hypervisor 311.

The translation and mapping of virtual machine requests by a hypervisor, however, is often operationally prohibitive. For example, the translation and mapping creates CPU overhead, which results in slow virtual machine performance.

One conventional solution to providing coordinated access to the underlying physical display adopts the above approach. The hypervisor vendor provides the virtual machine with a virtual GPU with its own display driver. The virtual machine display driver is instrumented with hooks to communicate to the hypervisor to facilitate desktop composition and remote display of a virtual machine.

In this conventional solution, the instrumented driver is simpler than a full function driver because it merely funnels commands to the real driver. An instrumented driver, however, does not provide the complete functionality of the underlying GPU. In addition, the instrumented driver creates CPU overhead when it funnels commands to the real driver.

The computer industry has developed computer hardware to improve virtual machine performance. In particular, the peripheral component interconnect special interest group (PCI SIG) has developed a specification that enables hardware devices to be natively sharable in a virtualized environment. The PCI single root I/O virtualization and sharing (SR-IOV) specification replicates in hardware the resources necessary for each virtual machine to be directly connected to an input/output (I/O) device so that data movement can occur without hypervisor involvement. Virtualized system 312 is computer hardware platform that implements the PCI SR-IOV specification.

A PCI SR-IOV device includes one or more physical functions. A physical function is a full-featured PCI express (PCIe) device that is discovered, managed, and configured as a normal PCIe device. Physical functions have full configuration resources, meaning that it's possible to configure or control the PCIe device via the physical function. Physical functions have full ability to move data in and out of the device.

A PCI SR-IOV device further includes one or more virtual functions associated with a physical function. A virtual function is a subset of a physical function that only processes I/O. Virtual functions cannot be configured because that would change the underlying physical function and thus all other virtual functions. The configuration of virtual functions can only be accomplished through the physical function.

In an embodiment, each virtual function has its own PCI configuration space and will typically provide unique memory space, work queues, interrupts, and command processing. In this embodiment, the hypervisor configures and assigns a virtual function to a virtual machine by mapping the actual virtual function PCI configuration space to the configuration space presented to the virtual machine by the hypervisor. The virtual functions utilize the common shared resources associated with the physical function. The shared resources are exposed to and managed by the hypervisor.

From the perspective of the virtual machine, the virtual function is a full-featured PCIe device.

Figure 4:
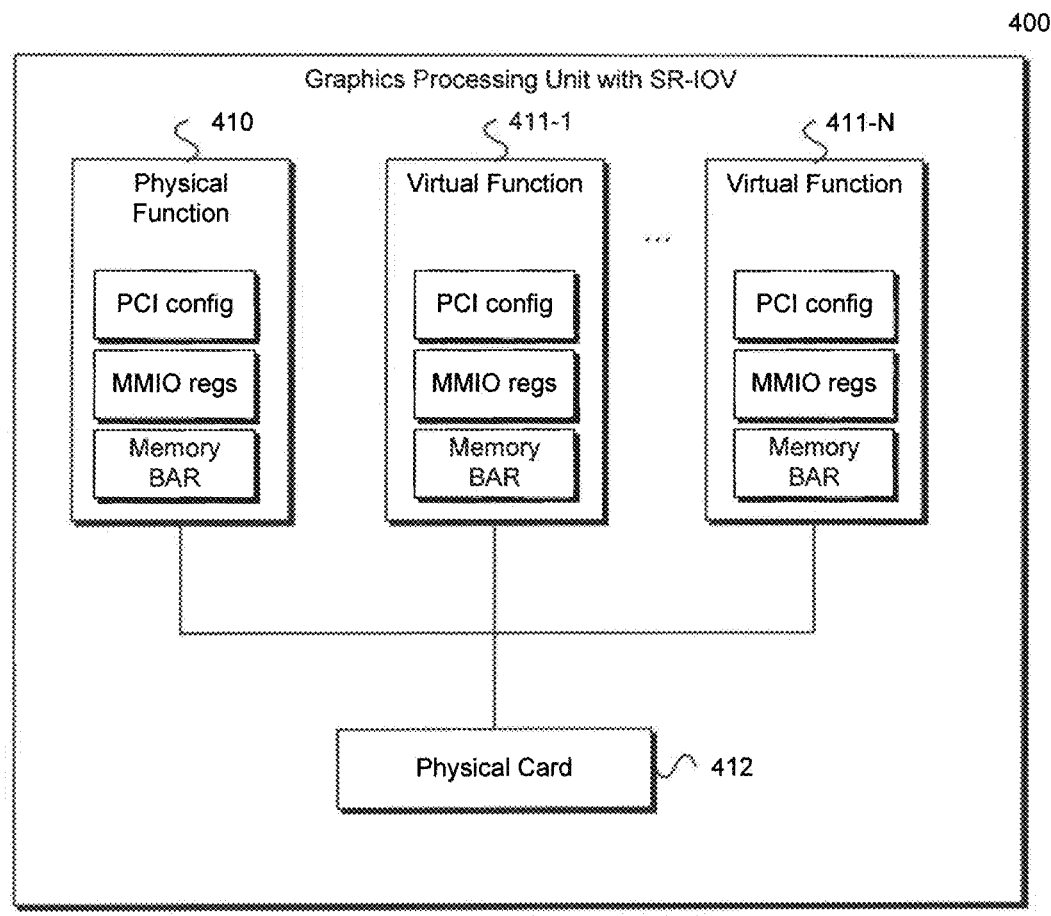
FIG. 4 is an illustration of a GPU constructed and arranged according to an embodiment of the invention.

FIG. 4 is a block diagram illustration of GPU 400 that implements the PCI SR-IOV specification, according to an embodiment of the present invention. GPU 400 includes a physical function 410, a virtual function 411-1 through 411-N (where N is any integer greater than or equal to 2), and a physical card 412. Physical card 412 may contain the physical connection a monitor.

Physical function 410 interacts directly with the underlying physical display and has its own PCI configuration, registers, and memory space. The GPU further includes one or more virtual functions (e.g. virtual functions 411). Each virtual function is configured and assigned to a virtual machine by the hypervisor. The virtual function appears to the virtual machine as though it was its own GPU.

Virtual function 411 has an independent PCI configuration set up by the hypervisor and mapped into a virtual machine. Virtual function 411 also has its own registers and memory space. For example, memory BAR represents the base address for the frame buffer associated with the assigned virtual machine.

Virtual function 411, however, does not have direct access to the underlying physical display. Virtual function 411 presents a duplicate subset of the physical function 410 resources in order to facilitate the simultaneous, efficient execution of multiple virtual machines. In particular, each virtual function 411 includes PCI configuration space, memory-mapped I/O (MMIO) registers, and memory base address registers (BARs). The hypervisor (e.g. hypervisor 311) and physical function 410 provide coordinated access to the underlying physical display. Physical card 412, for example, may contain the physical connection to a monitor.

Figure 5:
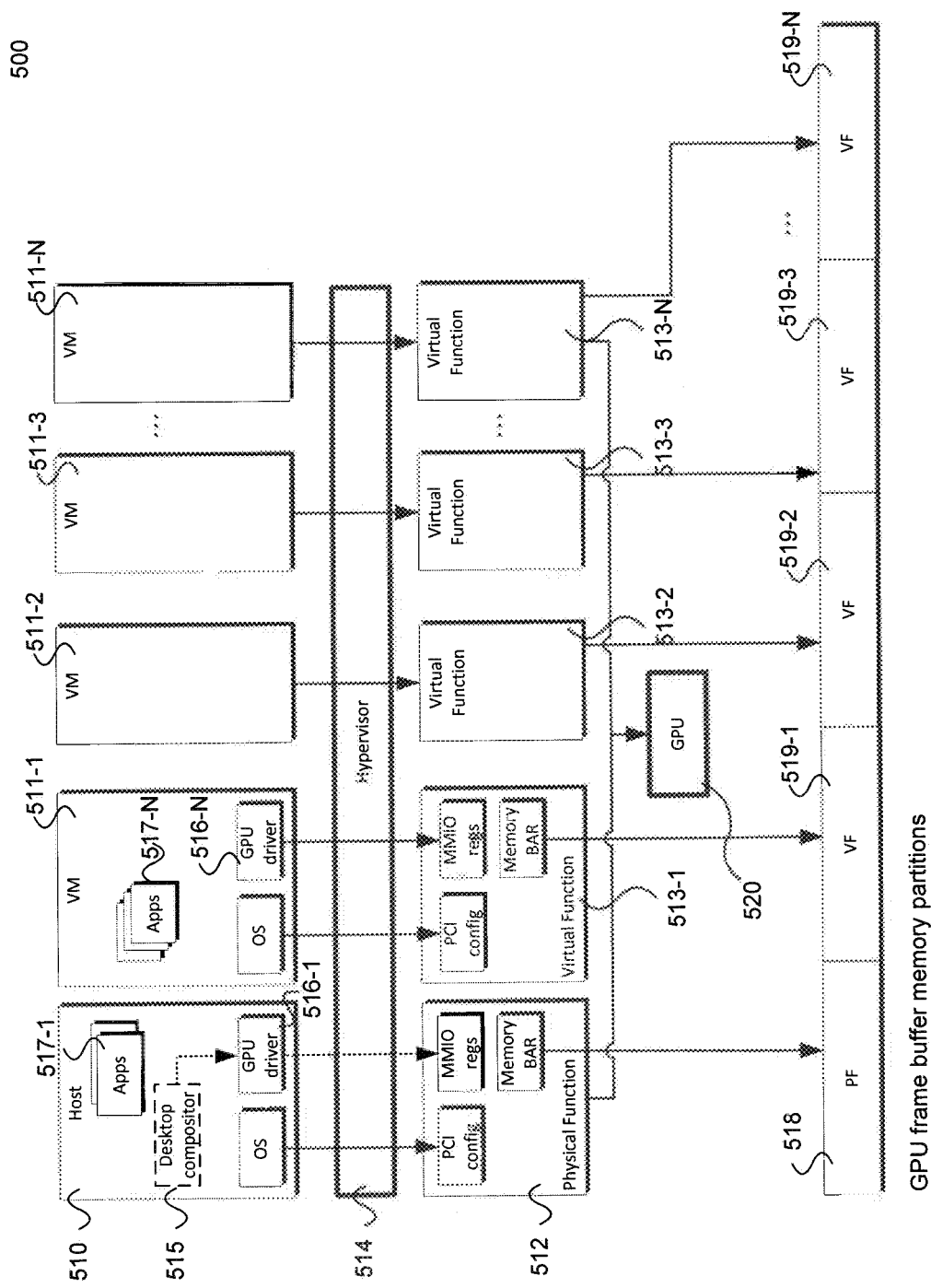
FIG. 5 is an illustration of the interaction between virtual machines and virtual functions associated with a GPU, according to an embodiment of the invention.

FIG. 5 is a block diagram illustration of computer system 500 depicting the mapping of virtual machines to physical functions and virtual functions, according to an embodiment of the present invention. Computer system 500 includes a host virtual machine 510, virtual machines 511-1 through 511-N, a physical function 512, virtual functions 513-1 through 513-N, and a hypervisor 514. Computer system 500 also includes a desktop compositor 515, GPU drivers 516-1 through 516-N, applications 517-1 through 517-N, a physical function frame buffer 518, virtual function frame buffers 519-1 through 519-N, and a GPU 520 (where N represents any integer greater than or equal to 2).

In FIG. 5, host virtual machine 510 is assigned the resources of physical function 512 by hypervisor 514. Host virtual machine 510 contains an operating system and GPU driver 516. The operating system and GPU driver 516 interact directly with physical function 512. In the embodiment, host virtual machine 510 discovers, manages, and configures the physical function as though it was a normal PCIe device.

Host virtual machine 510 further includes a desktop compositor 515 that combines the output of multiple virtual machines (e.g., surfaces) into a single surface for output to a monitor. Desktop compositor 515 transforms and scales the surfaces in order to output them at the display timing, resolution, and pixel depth associated with physical function 512.

Hypervisor 514 can include software that configures and manages the virtual machines and access to the underlying hardware. Virtual machine 511 is assigned the resources of virtual function 513 by hypervisor 514. Virtual machine 513 includes an operating system, GPU driver 516, and applications 517. Additionally, virtual function 513 is assigned a device configuration by hypervisor 514. The operating system and GPU driver 516 use this configuration to access virtual function 513. After configuration, the operating system and GPU driver 516 bypass hypervisor 514 and interact directly with virtual function 513 when processing any type of I/O requests.

In the present embodiment, GPU driver 516-N is identical, or nearly identical, to GPU driver 516-1 running on host virtual machine 510. In other words, the GPU driver in virtual machine 511 is a full function driver that provides access to the entire functionality of GPU 520.

The underlying rendering and drawing functionality provided by GPU 520 is shared among physical function 512 and its associated virtual functions, e.g. virtual functions 513. However, each virtual function has its own independent set of resources including register address map and memory address map. In particular, virtual function 513 is configured to have a separate frame buffer segment (e.g. virtual function frame buffer 519) to store and manipulate the graphic surface associated with virtual machine 511.

By way of background, in the normal graphics rendering sequence, there are two buffers: a front-buffer and a back-buffer. The front-buffer contains the surface being actively displayed on the monitor. The back-buffer contains the new surface being rendered for later display on the monitor. A surface register contains the memory address of the front-buffer. A flip status register is utilized to indicate when the new surface has been rendered to the back-buffer.

The front-buffer is displayed to the monitor. The GPU renders the new surface to the back-buffer in the background. When the GPU has completed rendering the new surface, the surface register is set to the memory address of the back-buffer. In addition, the flip status register is set to true to indicate that the surface register has been changed.

When the new surface has been rendered, it can be displayed to the monitor. The vertical synchronization signal occurs when the new surface can be displayed to the monitor. The vertical synchronization interrupt is generated when the vertical synchronization signal occurs at a periodic interval. When the interrupt is triggered, the GPU driver checks whether the flip status register has been set and whether the surface register contains a different memory address than it did at the last interrupt. The memory address contained in the surface register at the last interrupt is normally stored in memory.

If the flip status register has been set and the surface register is pointing at the new surface offset, a page flip has occurred and the new surface can be displayed to the monitor. If not, the new surface is not displayed until the registers are modified and there is another vertical synchronization signal. After the new surface is displayed to the monitor, the flip status register is cleared, the surface register is pointing at the new surface offset, and the page flip is complete.

Embodiments of the present invention provide a mechanism for coordinating access amongst the virtual machines to the underlying physical display and preserve the above graphic rendering sequence. By preserving the above graphic rendering sequence, the operating system and GPU driver in the virtual machine do not need to be modified.

Furthermore, in the embodiments, each virtual machine should have its own display timings and surface properties such as resolution, pixel format, and memory arrangement such as pitch and tiling structure. It is insufficient to modify the hypervisor to check when there is a page flip because the hypervisor does not know the virtual machine's display timings or its memory arrangement. Solutions provided by the embodiments emulate the surface register, the flip status register, display timings, and surface property registers in the virtual function with appropriate hardware and software logic.

Figure 6:
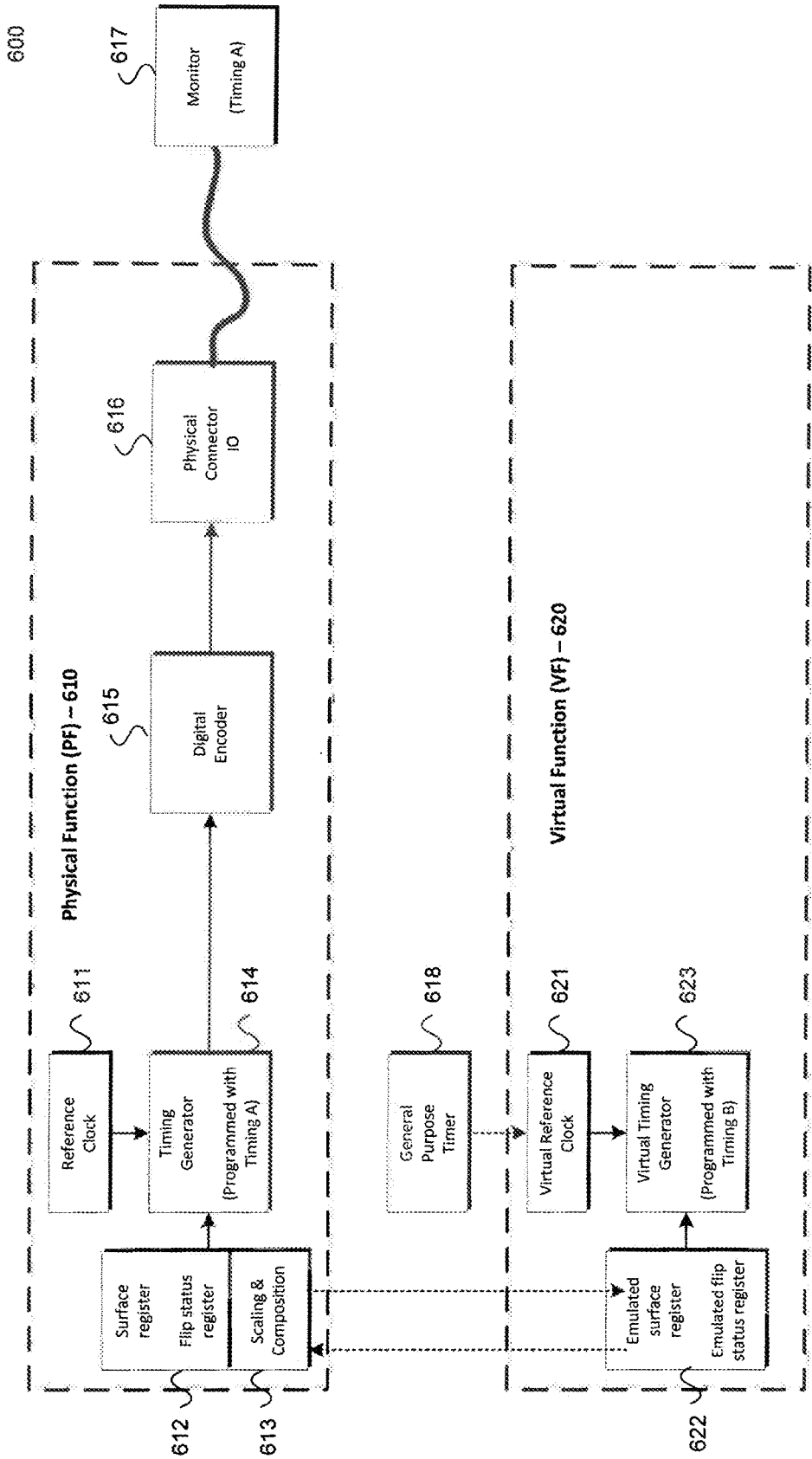
FIG. 6 is an illustration of the components that coordinate access to the physical display and enable virtual machines to implement page flipping, according to an embodiment of the invention.

FIG. 6 is a block diagram illustration of a GPU 600 implementing the PCI SR-IOV specification and containing display synchronization components, according to the embodiments. GPU 600 includes a reference clock 611, a surface register 612, a flip status register 612, a scaling and composition engine 613, a timing generator 614, a digital encoder 615, a physical connector 616, a monitor 617, and a general purpose timer 618. For each virtual function 620, GPU 600 includes a virtual reference clock 621, an emulated surface register 622, an emulated flip status register 622, and virtual timing generator 623. General purpose timer 618 may either be part of each virtual function 622 or external to each virtual function 622.

The physical function includes a reference clock 611, e.g. a quartz crystal, which drives timing generator 614. Timing generator 614 is programmed with vertical synchronization timing that matches attached monitor 617.

In GPU 600, the physical function further includes a surface register 612 that contains the memory address of the front-buffer. Scaling and composition engine 613 manipulates the surface contained in the front-buffer for display on monitor 617. Digital encoder 615 encodes the surface and physical connector I/O 616 outputs the encoded surface to monitor 617.

Virtual function 620 includes a virtual reference clock 621 that is driven by general purpose timer 618. Virtual reference clock 621 drives a virtual timing generator 623. Virtual timing generator 623 produces emulated display timings. More specifically, virtual timing generator 623 generates an emulated vertical synchronization interrupt. The emulated vertical synchronization interrupt is produced periodically at a fixed time interval and is independent of the display timings in the physical function.

Virtual function 620 further includes emulated surface register 622 and emulated flip status register 622 that can be set independent of physical function surface register 612 and flip status register 612. A write to emulated surface register 622 and emulated flip status register 622 does not modify surface register 612 and flip status register 612 in physical function 610. A write by the virtual function GPU driver to emulated surface register 622 and emulated flip status register 622, however, triggers a hardware interrupt in physical function 610. When the interrupt is triggered, the address stored in emulated surface register 622, the surface pointed to by emulated surface register 622, and the properties of the surface are propagated to the physical function via a hardware circuitry and surface property registers.

Figure 7:
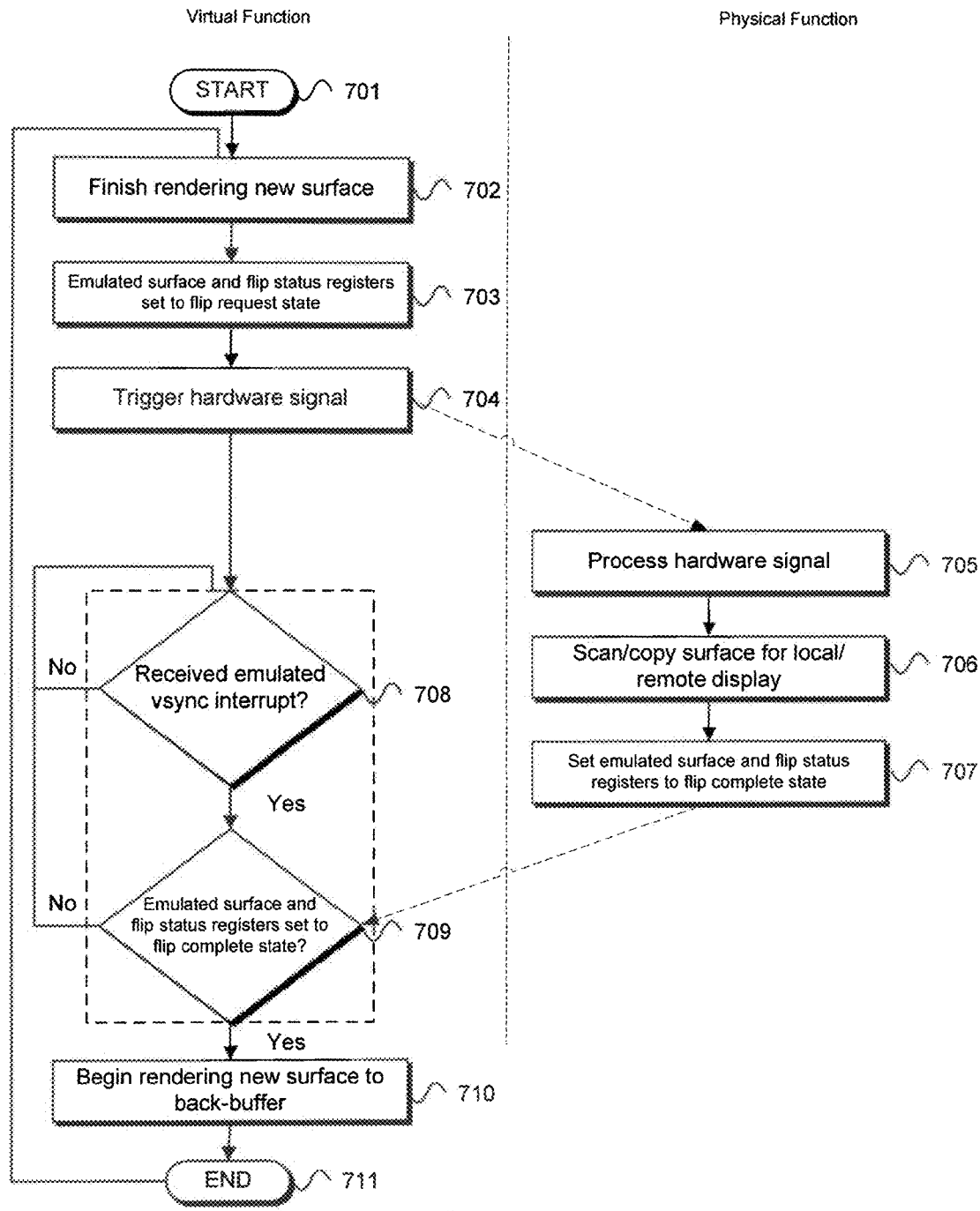
FIG. 7 is an illustration of a method to perform page flipping in a virtual machine, according to an embodiment of the invention.

FIG. 7 is flowchart of an exemplary method 700 illustrating the sequence of operations performed to emulate page flipping in a virtual machine and coordinate access to the underlying physical display, according to an embodiment of the present invention. Flowchart 700 includes operations 701 through 711.

In operation 701, the virtual machine begins rendering to the back-buffer associated with the virtual function. The front-buffer is being displayed on a monitor via the physical function. In operation 702, the GPU has rendered the new surface to the back-buffer. In operation 703, the GPU driver writes the surface offset of the new surface to be presented into the emulated surface register. The emulated flip status register is set to true to indicate a pending page flip. The above sequence of operations is identical to page flipping in a non-virtualized environment.

In operation 704, a hardware signaling mechanism, such as a hardware interrupt or a hardware register flag is generated in the physical function when the emulated surface register and emulated flip status register are attempted to be modified in the virtual function. The hardware interrupt or register flag signals the physical function that the virtual function has a page flip pending. More specifically, the hardware interrupt or register flag indicates that the virtual function has rendered a new surface that is ready to be output by the physical function to a monitor.

The interrupt or flag is processed in operation 705 by the host operating system and GPU driver. In order to process the interrupt or flag, a hardware circuitry on the GPU propagates the memory address to be stored in the emulated surface register and the value to be stored in the emulated flip status register to the physical function. Moreover, the properties of the new surface, including, but not limited to, pixel depth and resolution, are propagated to the physical function via a hardware circuitry.

In operation 706, the surface is consumed. More specifically, the host operating system and GPU driver scans or copies the surface from the virtual function memory for local or remote display. If the surface is to be displayed on a physically attached monitor, the host desktop compositor scans and manipulates the surface for output to the monitor. If the surface is to be displayed on a remote monitor, the surface is copied across a network communications channel to the remote monitor.

The virtual machine operating system and GPU driver have no knowledge that the host operating system and GPU driver are processing the surface in the physical function. The virtual machine and associated virtual function perform page flipping identically to a non-virtualized system. In fact, the virtual function generates an emulated vertical synchronization interrupt as though it was connected to a real display.

As previously discussed, the vertical synchronization interrupt is a synchronization mechanism that ensures that the new surface is ready to be output to a monitor. Because the virtual function GPU driver retains the existing page flipping model, the GPU driver checks at the emulated vertical synchronization interrupt whether the page flip is complete as shown in operations 708 and 709.

More specifically, the virtual function GPU driver checks at the time of the emulated vertical synchronization interrupt whether the emulated flip status register has been reset and whether the value in the emulated surface register is not equal to the previously saved memory address stored in the emulated surface register.

However, because the virtual function contains only emulated registers, the physical function needs to signal to the virtual function when it has processed the new surface. Once the physical function has scanned or copied the surface in operation 706, it updates the surface offset stored in the emulated surface register to point to the new surface and clears the emulated flip status register. The updating of the emulated surface register and the emulated flip status register indicates to the virtual function GPU driver that the flip is complete.

In operation 710, if the flip completion status obtained by the virtual function GPU driver via the emulated flip status register at the time of the emulated vertical synchronization interrupt indicates that the flip is complete, the virtual function is free to begin rendering a new surface to the back-buffer (formerly the front-buffer). By implementing operation 710, it is ensured that the virtual function GPU driver operates the same as a physical function GPU driver. The process would then complete at operation 711, with the option to repeat the entire process starting at operation 702.

By implementing these emulated display timings and registers in a GPU virtual function, multiple virtual machines can share the physical function and associated display simultaneously. Moreover, the presented embodiments afford complete access to the GPU's functionality, minimal performance overhead, and minimal changes to the operating system software and GPU driver.

The Summary and Abstract sections may set forth one or more but not all exemplary embodiments of the present invention as contemplated by the inventor(s), and thus, are not intended to limit the present invention and the appended claims in any way.

The embodiments herein have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

What is claimed is:

1. A computer-based system comprising:
a first virtual function module including a first virtual timing generator, a first emulated surface register, and a first emulated flip register;
a second virtual function module including a second virtual timing generator, a second emulated surface register, and a second emulated flip register, wherein the first emulated surface register and the first emulated flip register are configured to provide a first hardware interrupt signal indicating that a first new surface has been rendered and is ready for consumption according to the first virtual timing generator, wherein the second emulated surface register and the second emulated flip register are configured to provide a second hardware interrupt signal indicating that a second new surface has been rendered and is ready for consumption according to the second virtual timing generator, and wherein a hypervisor is configured to assign the first virtual function module to the first virtual machine and the second virtual function module to the second virtual machine; and
a physical function module comprising a physical timing generator configured to match a monitor's timing, wherein the physical function module is configured to consume the new surface according to the first hardware interrupt signal and the second hardware interrupt signal from the first and the second virtual function modules, wherein the physical timing generator, the first virtual timing generator and the second virtual timing generator are independent of each other.

2. The computer-based system of claim 1, wherein the physical function module is further configured to:
copy the first and the second new surfaces from a memory associated with the first and the second virtual function modules and draw the first and the second new surfaces to the monitor.

3. The computer-based system of claim 1, wherein the physical function module is further configured to:
read the first new surface from a memory associated with the first virtual function module and perform local composition of the first new surface and the second new surface for drawing on the monitor.

4. The computer-based system of claim 1, wherein the physical function module is further configured to:
copy the first and the second new surfaces from a memory associated with the first and the second virtual function modules to a network for remote display.

5. The computer-based system of claim 1, wherein the physical function module is further configured to:
obtain, using a hardware circuitry, a set of properties associated with the first and the second new surfaces.

6. The computer-based system of claim 1, wherein the first and the second virtual function modules are further configured to:
generate a register flag to signal the physical function module that the first and/or the second new surfaces have been rendered.

7. The computer-based system of claim 1, wherein the physical function module is further configured to:
latch the first and the second virtual timing generators so that notification that the first and the second new surfaces have been consumed is obtained by the first and the second virtual function modules via the first and second emulated flip registers at the time of an emulated vertical synchronization interrupt.

8. The computer-based system of claim 1, wherein the first virtual function module is further configured to produce virtual timing generator different from the second virtual timing generator.

9. The computer-based system of claim 1, wherein an operating system associated with the first and the second virtual function modules is identical to the operating system associated with the physical function module.

10. The computer-based system of claim 1, wherein a graphics device driver associated with the first and the second virtual function modules performs page flipping identically as the graphics device driver associated with the physical function module.

11. The computer-based system of claim 1, wherein the physical function further includes a surface register that is further configured to store a memory address of the first or the second new surfaces to be displayed on the monitor.

12. The computer-based system of claim 11, wherein the physical function further includes a flip register that is further configured to store a flip status, wherein the flip status indicates when the surface register is changed.

13. A method comprising:
rendering a first new surface for a first virtual function module, the first virtual function module comprising a first virtual timing generator, a first emulated surface register, and a first emulated flip register;
rendering a second new surface for a second virtual function module, the second virtual function module comprising a second virtual timing generator, a second emulated surface register, and a second emulated flip register, wherein the first emulated surface register and the first emulated flip register are configured to provide a first hardware interrupt signal indicating that the first new surface has been rendered and is ready for consumption according to the first virtual timing generator, wherein the second emulated surface register and the second emulated flip register are configured to provide a second hardware interrupt signal indicating that the second new surface has been rendered and is ready for consumption according to the second virtual timing generator, and wherein a hypervisor is configured to assign the first virtual function module to the first virtual machine and the second virtual function module to the second virtual machine; and a physical function module comprising a physical timing generator configured to match a monitor's timing, wherein the physical function module is configured to consume the new surface according to the first hardware interrupt signal and the second hardware interrupt signal from the first and the second virtual function modules, wherein the physical timing generator, the first virtual timing generator and the second virtual timing generator are independent of each other.

14. The method of claim 13, wherein consuming the first and the second new surfaces further comprises:

copying the first and the second new surfaces from a memory associated with the first and the second virtual function modules for display on the monitor.

15. The method of claim 13, wherein consuming the first and the second new surfaces further comprises:

reading the first new surface from a memory associated with the first virtual function module and performing local composition of the first new surface and the second new surface to display on the monitor.

16. The method of claim 13, wherein consuming the first and the second new surfaces further comprises:

copying the first and the second new surfaces from a memory associated with the first and second virtual function modules to a network for remote display on the monitor.

17. The method of claim 13, further comprising:

obtaining, using a hardware circuitry, a set of properties associated with the first and the second new surfaces.

18. The method of claim 13, wherein generating a signal via the first and the second emulated surface registers and the first and the second emulated flip registers further comprises:

generating a register flag into the physical function module.

19. The method of claim 13, wherein generating a signal for the first and the second virtual function modules further comprises:

latching the first and the second virtual timing generators so that notification that the first and the second new surfaces have been consumed is obtained by the first and the second virtual function modules via the first and the second emulated flip registers at the time of an emulated vertical synchronization interrupt.

20. The method of claim 13, wherein the first virtual function module produces the first virtual timing generator different from the second virtual timing generator.

21. The method of claim 13, wherein the physical function further includes a surface register that is further configured to store a memory address of the first or the second new surfaces to be displayed on the monitor.

22. The method of claim 21, wherein the physical function further includes a flip register that resource is further configured to store a flip status, wherein the flip status indicates when the surface register is changed.

23. A computer-readable storage device having computer-executable instructions stored, execution of which, by a computing device, causes the computing device to perform operations comprising:

rendering a first new surface for a first virtual function module, the first virtual function module comprising a first virtual timing generator, a first emulated surface register, and a first emulated flip register;

rendering a second new surface for a second virtual function module, the second virtual function module comprising a second virtual timing generator, a second emulated surface register, and a second emulated flip register, wherein the first emulated surface register and the first emulated flip register are configured to provide a first hardware interrupt signal indicating that the first new surface has been rendered and is ready for consumption according to the first virtual timing generator, wherein the second emulated surface register and the second emulated flip register are configured to provide a second hardware interrupt signal indicating that the second new surface has been rendered and is ready for consumption according to the second virtual timing generator, and wherein a hypervisor is configured to assign the first virtual function module to the first virtual machine and the second virtual function module to the second virtual machine; and a physical function module comprising a physical timing generator configured to match a monitor's timing, wherein the physical function module is configured to consume the new surface according to the first hardware interrupt signal and the second hardware interrupt signal from the first and the second virtual function modules, wherein the physical timing generator, the first virtual timing generator and the second virtual timing generator are independent of each other.

24. The computer-readable storage device recited in claim 23, wherein consuming the first and the second new surfaces further comprises:

copying the first and the second new surfaces from a memory associated with the first and the second virtual function modules to display on the monitor.

25. The computer-readable storage device recited in claim 23, wherein consuming the first and the second new surfaces further comprises:

reading the first new surface from a memory associated with the first virtual function module and performing local composition of the first new surface and the second new surface to display on the monitor.

26. The computer-readable storage device recited in claim 23, wherein consuming the first and the second new surfaces further comprises:

copying the first and the second new surfaces from a memory associated with the first and the second virtual function modules to a network for remote display on the monitor.

27. The computer-readable storage device recited in claim 23, further comprising:

obtaining, using a hardware circuitry, a set of properties associated with the first and the second new surfaces.

28. The computer-readable storage device recited in claim 23, wherein generating a signal via the first and the second emulated surface registers and the first and the second emulated flip registers further comprises:

generating a register flag into the physical function module.

29. The computer-readable storage device recited in claim 23, wherein generating a signal for the first and the second virtual function modules further comprises:

latching the emulated display timing so that notification that the first and the second new surfaces have been consumed is obtained by the first and the second virtual function modules via the first and the second emulated flip registers at the time of an emulated vertical synchronization interrupt.

30. The computer-readable storage device recited in claim 23, wherein the virtual function module produces virtual timing generator different from at least one other virtual timing generator.

31. The computer-readable storage device recited in claim 23, wherein the physical function further includes a surface register that is further configured to store a memory address of the first and the second new surfaces to be displayed on the monitor.

32. The computer-readable storage device recited in claim 31, wherein the physical function further includes a flip register that is further configured to store a flip status, wherein the flip status indicates when the surface register is changed.

* * * * *